(12) United States Patent
Whyte

(10) Patent No.: US 6,751,867 B1
(45) Date of Patent: Jun. 22, 2004

(54) TUBE CUTTER

(76) Inventor: Joseph James Whyte, 10040 Sunset Dr., Stanwood, MI (US) 49346

( * ) Notice: Subject to any disclaimer, the term of this patent is extended or adjusted under 35 U.S.C. 154(b) by 237 days.

(21) Appl. No.: 09/989,878

(22) Filed: Nov. 21, 2001

(51) Int. Cl.[7] .......................... B23D 21/08; D26B 13/26
(52) U.S. Cl. .............................. 30/101; 30/134; 81/182; 81/318; 82/70.2
(58) Field of Search .......................... 83/522.19; 81/9.4, 81/9.41, 486, 182, 126, 319, 332, 360; 30/101, 102, 94, 134, 75, 90.1, 91.2, 90.9, 90.3, 97, 98, 99, 93, 92; 451/51; 82/70, 70.2, 72, 113

(56) References Cited

U.S. PATENT DOCUMENTS

| | | | | |
|---|---|---|---|---|
| 2,007,122 A | * | 7/1935 | Briegel | 30/102 |
| 2,325,353 A | * | 7/1943 | Wright | 30/102 |
| 2,563,483 A | * | 8/1951 | O'Hagan | 30/102 |
| 2,851,773 A | * | 9/1958 | Jennison | 225/94 |
| 3,136,057 A | * | 6/1964 | Jones et al. | 30/101 |
| 3,240,088 A | * | 3/1966 | Samules et al. | 82/128 |
| 3,545,081 A | * | 12/1970 | Butler | 30/123 |
| 3,672,050 A | * | 6/1972 | Hanback | 30/99 |
| 4,318,289 A | | 3/1982 | Eaton | |
| 4,531,288 A | | 7/1985 | Aubriot | |
| 4,769,911 A | * | 9/1988 | Araki | 30/94 |
| 4,831,732 A | * | 5/1989 | Garton | 30/101 |
| 5,033,153 A | * | 7/1991 | Post | 30/102 |
| 5,099,577 A | * | 3/1992 | Hutt | 30/101 |
| 5,206,996 A | | 5/1993 | McDaniel | |
| 5,475,924 A | | 12/1995 | McDaniel | |
| 5,515,609 A | | 5/1996 | Sperti | |
| 5,581,886 A | * | 12/1996 | Sesser et al. | 30/101 |
| 5,836,079 A | | 11/1998 | Cronin et al. | |
| 5,943,778 A | * | 8/1999 | Alana | 30/101 |
| 6,202,307 B1 | * | 3/2001 | Wrate | 30/101 |
| 6,237,449 B1 | * | 5/2001 | Orlosky | 81/360 |
| 6,336,270 B1 | * | 1/2002 | Dureiko | 30/102 |
| 6,357,119 B1 | * | 3/2002 | Acerra | 30/102 |
| 2003/0054738 A1 | * | 3/2003 | Feeley | 451/51 |

* cited by examiner

Primary Examiner—Allan N. Shoap
Assistant Examiner—Ghassem Alie
(74) Attorney, Agent, or Firm—Young & Basile, PC

(57) ABSTRACT

A pliers-type pipe or tube cutter includes first and second members pivotably movable with respect to one another. At least one adjustable cutting wheel is supported on one of the opposing jaw portions to be operably engagable with a tube or pipe to be cut. In addition, at least one cleaning element is supported on one of the opposing jaw portions for operable engagement with an exterior surface of the tube or pipe during the cutting process.

20 Claims, 2 Drawing Sheets

TUBE CUTTER

FIELD OF THE INVENTION

The present invention relates to cutters, and in particular pipe or tube cutters.

BACKGROUND OF THE INVENTION

Various configurations of tube and pipe cutting devices are known to those skilled in the art. A pliers-type tubing cutter is known to include first and second handle members pivotably coupled together and including first and second jaws. Cutting assemblies are supported within each jaw and include spaced and rotatable cutting discs which engage an exterior of a conduit to effect cutting of the conduit during manual rotation of the tool. Another known tool discloses a tubing cutter of selectable force is also known where an elongate cavity is disposed in the body member in substantial alignment with a pair of rollers, and an elongate ram member is slidably disposed in a non-rotatable manner in the elongate cavity, such that one end of the ram member supports a cutter wheel. The cutter wheel is rotatably supported in an opposed relationship to the rollers, and a rotatable adjustment device is located on the body member at a location comparatively remote from the rollers. The rotatable adjustment device is selectively rotatable to control the positioning of the ram member and therefore the positioning of the cutter wheel with respect to the rollers. The selective rotation of the rotatable adjustment device modifies the force applied to the ram member by the spring, and the force applied to the cutter wheel, to selectively control the amount of force consistently applied by the cutter wheel during the cutting of tubing residing on the rollers.

While these devices adequately perform the function of cutting piping or tubing, the devices do not perform the additional function of simultaneously cleaning the outer periphery of the pipe or tubing, which is a necessary step in the preparation of an end of tubing during the assembly operation. After using the known pipe cutters, it is necessary to locate a separate pipe-end-cleaning tool to perform the cleaning operation after the cutting process has been completed.

SUMMARY OF THE INVENTION

It would be desirable in the present invention to provide a single tool capable of cutting piping or tubing, while simultaneously cleaning the external periphery of the piping or tubing in a single step operation. The present invention provides a tube or pipe cutter suitable for cutting copper pipe and plastic tube. The tube cutter tool according to the present invention includes a plurality of cutters on adjustable spring tension supports in a pliers-type configuration. The pliers-type configuration can include a slot to adjust for different size pipes between the jaws of the pliers. A plurality of cleaning elements or polishing rods for copper pipe can be included between the plurality of cutters.

Other applications of the present invention will become apparent to those skilled in the art when the following description of the best mode contemplated for practicing the invention is read in conjunction with the accompanying drawings.

BRIEF DESCRIPTION OF THE DRAWINGS

The description herein makes reference to the accompanying drawings wherein like reference numerals refer to like parts throughout the several views, and wherein.

DESCRIPTION OF THE PREFERRED EMBODIMENT

Figure 1:
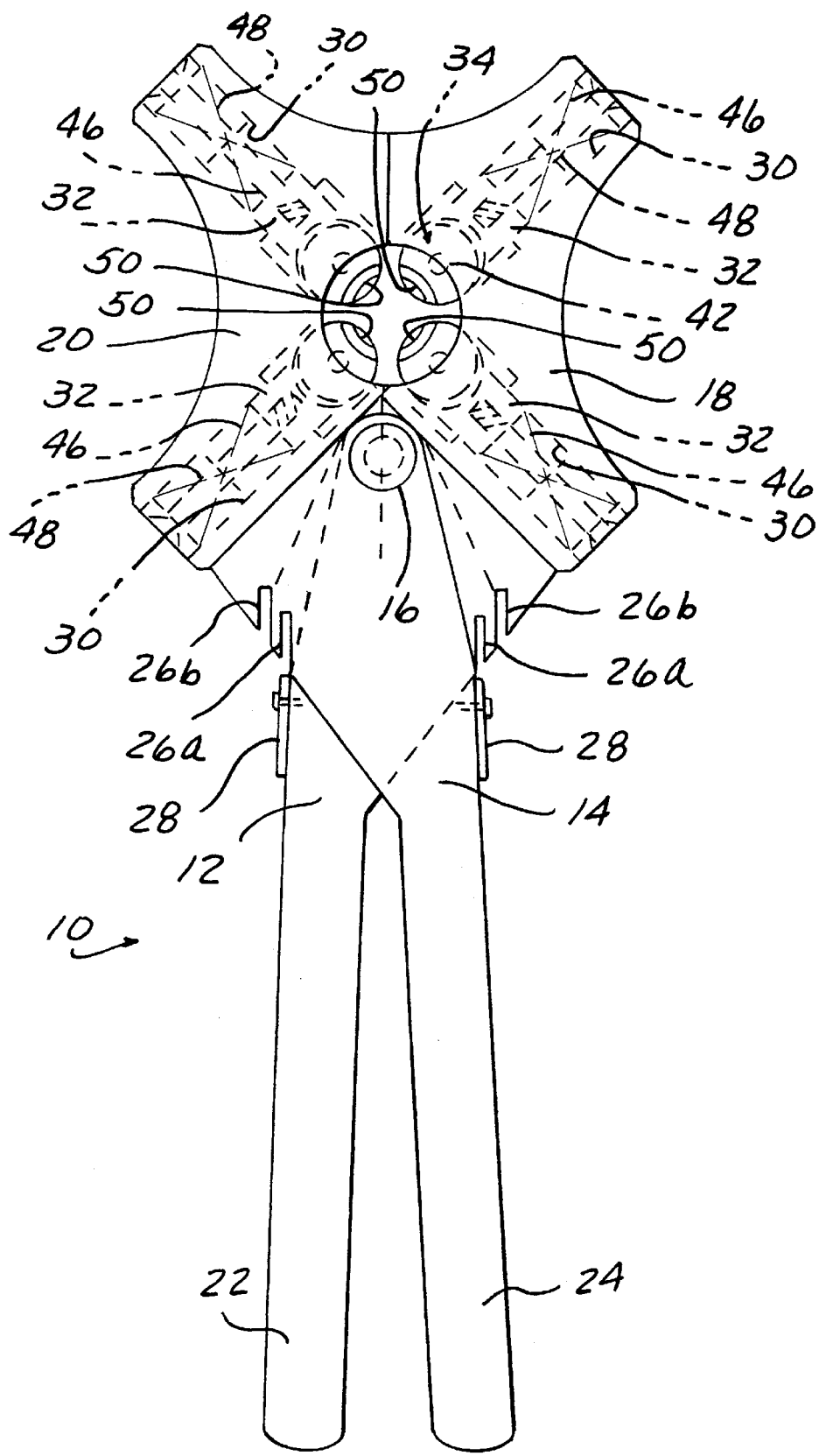
FIG. 1 is a plan view of a pliers-type tube cutter according to the present invention having a plurality of cutters with a plurality of cleaning elements or polishing rods disposed between the plurality of cutters.
Figure 2:
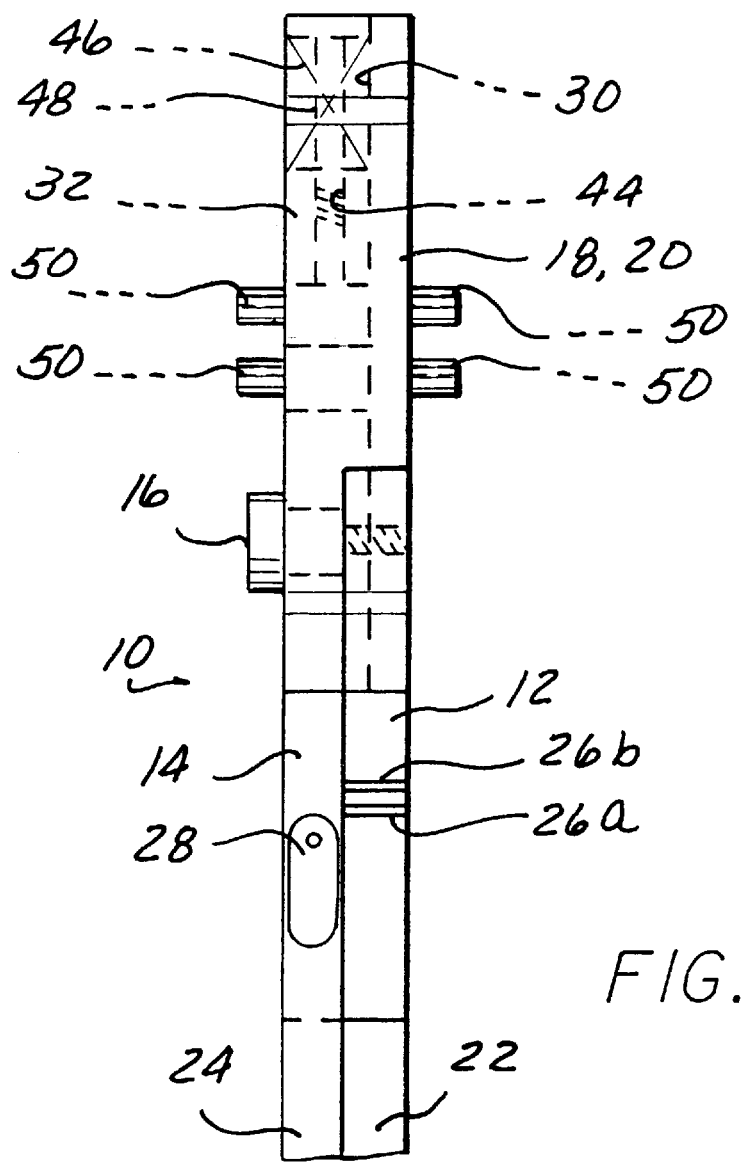
FIG. 2 is a side view of the pliers-type tube cutter according to the present invention.

Referring now to FIGS. 1 and 2, a pipe or tube cutter 10 is disclosed having first and second members 12, 14 pivotally connected with respect to one another about a pivot pin or member 16. By way of example and not limitation, the pivot pin or pivot member 16 is illustrated as a shoulder bolt in FIGS. 1 and 2. The first and second members 12, 14 define opposing jaw portions 18, 20 and opposing handle portions 22, 24 with respect to the pivot pin 16. The pliers-type pipe or tube cutter 10 according to the present invention can also include a lock and/or adjustment member 28 disposed between the first and second members 12, 14. The lock and adjustment member 28 can lock the opposing jaw portions 18, 20 with respect to one another for receiving different size pipes or tubes for cutting. By way of example and not limitation, the lock and adjustment member 28 can be selectively adjusted to accommodate ¾ inch diameter pipe and ½ inch diameter pipe. A lock member 28 is pivotally connected to one or both handle portions 22, 24 for pivoting movement into locking engagement with corresponding slots 26a, 26b for different size pipe.

Figure 3:
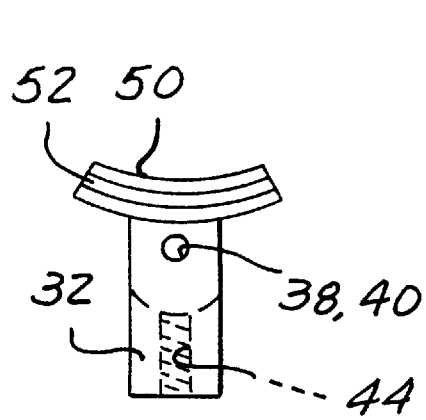
FIG. 3 is a detailed view of a cutter wheel support member according to the present invention.
Figure 4:
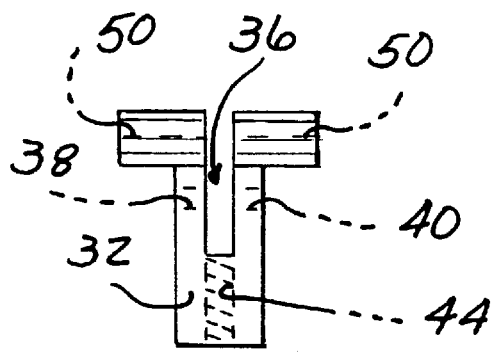
FIG. 4 is a side view of the cutter wheel support member illustrated in FIG. 3.

The opposing jaw portions 18, 20 of the first and second members 12, 14 include at least one aperture 30 extending therethrough. Preferably, each opposing jaw portion 18, 20 includes at least one aperture 30 extending therethrough. In the preferred configuration illustrated in FIGS. 1 and 2, by way of example and not limitation, each opposing jaw portion 18, 20 includes a plurality of apertures 30. A reciprocal cutter wheel support member 32 is receivable within the aperture 30. The cutter support member 32 is best seen in FIGS. 3 and 4. The cutter support member 32 is complementary in shape with respect to the aperture 30 permitting non-rotatable reciprocation within the aperture 30, while maintaining the orientation of the cutting wheel 34 supported therefrom. The cutter support member 32 includes a slot 36 formed therein for receiving the cutting wheel 34. A pair of coaxially aligned apertures 38, 40 are provided through opposing wall portions defining the slot 36 in order to rotatably mount the cutting wheel 34 with respect to the cutter wheel support member 32 with a central pin or shaft 42. The cutter wheel support member 32 can also include a threaded aperture 44 extending through the body of the cutter support member 32.

Referring again to FIGS. 1 and 2, a spring 46 is positioned within the aperture 30 for engagement with the cutter support member 32 opposite from the cutting wheel 34 for biasing the cutting wheel 34 toward the center of the opposing jaw portion 18, 20 of the first and second member 12, 14. An adjustable threaded member 48 threadingly engages the threaded aperture 44 at one end, and is operably engagable at an opposite end external of the opposing jaw portion for reciprocally moving the cutter support member 32 within the aperture 30 in response to rotation of the adjustable threaded member 48. Each cutting wheel 34 supported in this manner is independently adjustable by operably engaging and rotating the adjustable threaded member 48 in order to position the corresponding cutting wheel 34 supported by the cutter support member 32 in the desired position with respect to the tube to be cut.

Referring now to FIGS. 3 and 4, the cutter support members 32 include enlarged arcuate wings for supporting cleaning elements 50 attached by a compressible base member 52. By way of example and not limitation, the cleaning elements 50 can include sanding pads supported on a compressible base 52. As illustrated in the embodiment of FIG. 1, at least one cleaning element 50 is provided. In the preferred configuration, at least one cleaning element 50 is connected to each opposing portion 18, 20 of the first and second members 12, 14. In the illustrated embodiment of FIG. 1, four cleaning elements 50 are provided. The compressible base 52 can adhesively receive the cleaning elements 50 allowing the cleaning elements to be removed and replaced as required during use of the tube cutter 10 according to the present invention.

While the invention has been described in connection with what is presently considered to be the most practical and preferred embodiment, it is to be understood that the invention is not to be limited to the disclosed embodiments but, on the contrary, is intended to cover various modifications and equivalent arrangements included within the spirit and scope of the appended claims, which scope is to be accorded the broadest interpretation so as to encompass all such modifications and equivalent structures as is permitted under the law.

What is claimed is:

1. A tube cutter comprising:
   first and second members pivotally connected with respect to one another to define opposing jaw portions and opposing handle portions of a pliers-type configuration;
   a plurality of cutting wheels adjustably supported from each of the opposing jaw portions for movement toward and away for the other jaw portion;
   a plurality of cleaning members releasably supported from each of the opposing jaw portions to be operable engagable with an external surface of a tube to be cut; and
   a separate cutter-wheel-supporting member individually supporting each cutting wheel for rotation about an axis and supporting a corresponding cleaning member for engagement with the external surface of the tube to be cut, each cutter-wheel-supporting member releasably supported for adjustable movement from one of the opposing jaw portions to be operably engagable with an external surface of a tube being cut.

2. The tube cutter of claim 1 further comprising:
   a lock member movably supported on the handle portion of one of the first and second members for movement between an engaged position and a disengaged position, the lock member for selectively sizing the jaw portions for different size tubes to be cut by selectively engaging with one of a plurality of slots formed in the jaw portion of the other of the first and second members when in the engaged position.

3. The tube cutter of claim 1 further comprising:
   each of the opposing jaw portions including an aperture extending therethrough for supporting each cutter-wheel-supporting member;
   each cutter-wheel-supporting member non-rotatably and reciprocally engagable with the aperture; and
   an adjustment member operably engagable with the cutter-wheel-supporting member at one end and extending external of the jaw portion at an opposite end for selectively moving the supporting member reciprocally within the aperture in response to manipulation of the adjustment member.

4. The tube cutter of claim 3 wherein the adjustment member further comprises a threaded member for rotational adjustment with respect to the jaw portion.

5. The tube cutter of claim 4 further comprising:
   the cutter-wheel-supporting member having a threaded aperture therein for receiving the threaded adjustment member.

6. The tube cutter of claim 3 further comprising:
   the cutter-wheel-supporting member having a slot formed therein for receiving the cutting wheel, and two coaxially aligned apertures on opposite sides of the slot; and
   a central pin extending through the coaxially aligned apertures for rotatably supporting the cutting wheel.

7. The tube cutter of claim 1 wherein the cleaning element is a sanding pad.

8. The tube cutter of claim 1 further comprising:
   the cleaning element connected to the corresponding jaw portion with a compressible member.

9. The tube cutter of claim 1 further comprising:
   each cutter-wheel-supporting member having a slot therein for mounting the cutting wheel for rotation about an axis, and an outwardly extending cleaning-element-supporting portion positioned with respect to the cutting wheel for simultaneous cutting and cleaning of the external surface of the tube to be cut.

10. The tube cutter of claim 1 further comprising:
    each cutter-wheel-supporting member having a slot therein for mounting the cutting wheel for rotation about an axis, and outwardly extending cleaning-element-supporting portions on both sides of the cutting wheel and positioned with respect to the cutting wheel for simultaneous cutting and cleaning of the external surface of the tube to be cut.

11. The tube cutter of claim 1 further comprising:
    each cutter-wheel-supporting member having a slot therein for mounting the cutting wheel for rotation about an axis, and outwardly extending cleaning-element-supporting portions on both sides of the cutting wheel with concave arcuate cleaning-element-supporting surfaces facing the external surface of the tube to be cut, and positioned with respect to the cutting wheel for simultaneous cutting and cleaning of the external surface of the tube to be cut.

12. A tube cutter comprising:
    first and second members pivotally connected with respect to one another to define opposing jaw portions and opposing handle portions of a pliers-type configuration;
    a plurality of cutting wheels adjustably supported from each one of the opposing jaw portions for movement toward and away for the other jaw portion;
    a cutter-wheel-supporting member for each cutting wheel, each cutter-wheel-supporting member mounted with respect to one of the opposing jaw portions for adjustable movement toward and away from an external surface of a tube to be cut; and
    a plurality of cleaning members, each member releasably supported from one of the cutter-wheel-supporting members on one of the opposing jaw portions for adjustable movement with the cutter-wheel-supporting member to be operably engagable with the external surface of the tube being cut.

13. The tube cutter of claim 12 further comprising:

a lock member movably supported on the handle portion of one of the first and second members for movement between an engaged position and a disengaged position, the lock member for selectively sizing the jaw portions for different size tubes to be cut by selectively engaging with one of a plurality of slots formed in the jaw portion of the other of the first and second members when in the engaged position.

14. The tube cutter of claim 12 further comprising:

each one of the opposing jaw portions including an aperture extending therethrough for supporting each cutting wheel;

each cutter-wheel-supporting member non-rotatably and reciprocally engagable with each aperture, and including a threaded aperture at one end;

a spring for biasing the cutter-wheel-supporting member toward an opposing jaw portion;

a threaded adjustment member operably engagable with the threaded aperture of the cutter-wheel-supporting member at one end and extending external of the jaw portion at an opposite end for selectively moving the cutter-wheel-supporting member reciprocally within the aperture in response to rotational manipulation of the adjustment member.

15. The tube cutter of claim 12 wherein the cleaning element is a sanding pad.

16. The tube cutter of claim 12 further comprising:

cleaning element connected to the corresponding jaw portion with a compressible member.

17. The tube cutter of claim 12 further comprising:

each cutter-wheel-supporting member having a slot therein for mounting the cutting wheel for rotation about an axis, and an outwardly extending cleaning-element-supporting portion positioned with respect to the cutting wheel for simultaneous cutting and cleaning of the external surface of the tube to be cut.

18. The tube cutter of claim 12 further comprising:

each cutter-wheel-supporting member having a slot therein for mounting the cutting wheel for rotation about axis, and outwardly extending cleaning-element-supporting portions on both sides of the cutting wheel and positioned with respect to the cutting wheel for simultaneous cutting and cleaning of the external surface of the tube to be cut.

19. The tube cutter of claim 12 further comprising:

each cutter-wheel-supporting member having a slot therein for mounting the cutting wheel for rotation about an axis, and outwardly extending cleaning-element-supporting portions on both sides of the cutting wheel with concave arcuate cleaning-element-supporting surfaces facing the external surface of the tube to be cut, and positioned with respect to the cutting wheel for simultaneous cutting and cleaning of the external surface of the tube to be cut.

20. A tube cutter comprising:

first and second members pivotally connected with respect to one another to define opposing jaw portions and opposing handle portions of a pliers-type configuration;

a plurality of cutting wheels adjustably supported from each one of the opposing jaw portions for movement toward and away for the other jaw portion, each one of the opposing jaw portions including an aperture extending therethrough for supporting each cutting wheel;

a cutter-wheel-supporting member for each cutting wheel, each cutter-wheel-supporting member mounted with respect to one of the opposing jaw portions for adjustable movement toward and away from an external surface of a tube to be cut, each cutter-wheel-supporting member non-rotatably and reciprocally engagable within each aperture and including a threaded aperture at one end;

a spring for biasing each cutter-wheel-supporting member toward an opposing jaw portion;

a threaded adjustment member operably engagable with the threaded aperture of the cutter-wheel-supporting member at one end and extending external of the jaw portion at an opposite end for selectively moving the cutter-wheel-supporting member reciprocally within the aperture in response to rotational manipulation of the adjustment member, a plurality of cleaning members, each cleaning member releasably supported from one of the cutter-wheel-supporting members on one of the opposing jaw portions for adjustable movement with the cutter-wheel-supporting member to be operably engagable with the external surface of the tube to be cut, wherein the cleaning element is a sanding pad connected to the corresponding jaw portion with a compressible member; and a lock member movably supported on the handle portion of one of the first and second members for movement between an engaged position and a disengaged position, the lock member for selectively sizing the jaw portions for different size tubes to be cut by selectively engaging with one of a plurality of slots formed in the jaw portion of the other of the first and second members when in the engaged position.

* * * * *